H. MILLER.
Paint Can.
No. 2,592. Reissued May 7, 1867.
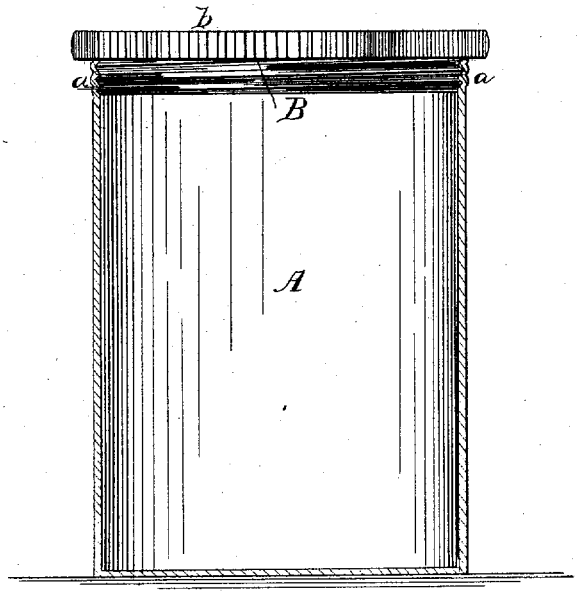
Witnesses:
Theo Tusche
J A Sewell.
Inventor:
H Miller
Per Munn & Co
Attorneys
N. PETERS, Photo-Lithographer, Washington, D. C.

UNITED STATES PATENT OFFICE.

HERMAN MILLER, OF HOBOKEN, NEW JERSEY.

IMPROVEMENT IN PAINT-CANS.

Specification forming part of Letters Patent No. 63,283, dated March 26, 1867; Reissue No. 2,592, dated May 7, 1867.

*To all whom it may concern:*

Be it known that I, HERMAN MILLER, of Hoboken, in the county of Hudson and State of New Jersey, have invented a new and useful Improvement in Paint-Cans; and I do hereby declare that the following is a full, clear, and exact description thereof, which will enable others skilled in the art to make and use the same, reference being had to the accompanying drawing, forming part of this specification.

The drawing represents a vertical sectional view of my improved paint-can.

The object of this invention is to so arrange cans in which the ready-made paint is kept for sale that the same may be opened and reclosed with ease and still be at all times air-tight.

It has been a matter of great inconvenience to painters that the cans in which the paint is sold could not, when once opened, be reclosed again. These cylindrical cans are made of tin, a round hole being left in the top plate which, when the can was filled, was closed by a circular piece of tin that was soldered to the top plate. Whoever wished to buy paint of a certain shade was obliged to trust to the knowledge and opinion of the seller, and when afterward, on opening the can by cutting out a portion of the top plate, he found that the paint in it did not correspond with the shade required, he was obliged to keep the useless article, as the seller would not take the injured can back. Furthermore, when a smaller quantity of paint was required for a certain purpose than was contained in the can, the residue had to be exposed to the injurious influence of the atmospheric air, as the can, when once opened, could not be again closed air-tight.

My invention overcomes all these difficulties; and it consists in the application and arrangement of a cover which is made of wood, iron, or other suitable material, and which is provided with a screw-thread and is screwed to the can when the same is thus closed air-tight. A can thus arranged can easily be opened for inspection and reclosed, and it can also be easily closed to keep the residue of paint, as long as the same is not used, fresh and good.

A represents the can, which is made of tin or other suitable material, and which is constructed in the usual manner, with the exception of the screw-thread *a* near its top, which is either cut or pressed into it, according to the material of which the can is made.

The cover B, which is made of wood, metal, or other suitable material, is provided with a screw-thread around its rim corresponding to that on the can, is screwed into the can A, as shown, and is provided with a projecting rim, *b*, which tends to keep the can completely air-tight, and whereby the cover may be handled for screwing or unscrewing.

Before applying I would prefer to dip the cover, should the same be made of wood, or at least its lower surface, in molten wax, so that particles of paint will be prevented from entering the pores of the wood and from thus destroying the same.

Having thus described my invention, what I claim as new, and desire to secure by Letters Patent, is—

The cover B, which is made of wood, iron, or other suitable material, and which is screwed to the paint-can A for the purpose of easily opening and reclosing the same, substantially as herein shown and described.

The above specification of my invention signed by me this 8th day of April, 1867.

HERMAN MILLER.

Witnesses:

WM. F. MCNAMARA,
ALEX. F. ROBERTS.